No. 775,181. PATENTED NOV. 15, 1904.
V. M. KENT.
MEAT PRESS.
APPLICATION FILED JUNE 8, 1904.
NO MODEL.
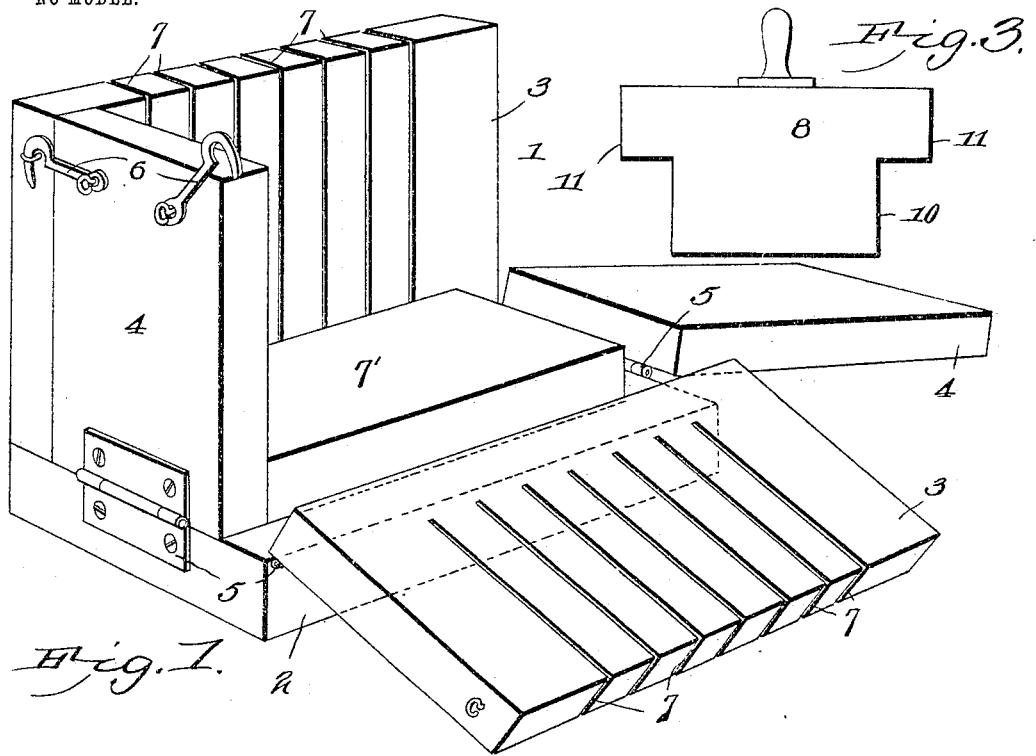
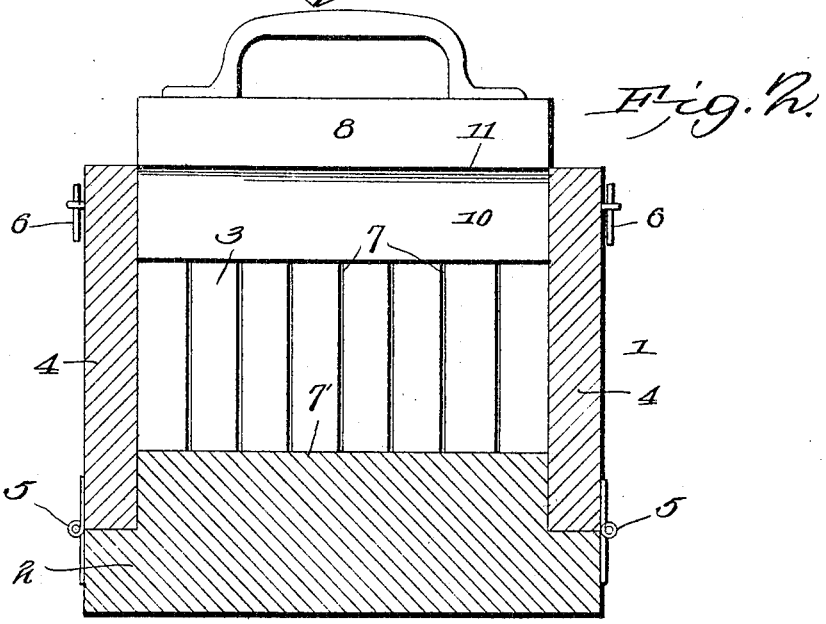

No. 775,181. Patented November 15, 1904.

UNITED STATES PATENT OFFICE.

VINE M. KENT, OF PINE VALLEY, NEW YORK.

MEAT-PRESS.

SPECIFICATION forming part of Letters Patent No. 775,181, dated November 15, 1904.

Application filed June 8, 1904. Serial No. 211,705. (No model.)

*To all whom it may concern:*

Be it known that I, VINE M. KENT, a citizen of the United States, residing at Pine Valley, in the county of Chemung and State of New York, have invented a new and useful Meat-Press, of which the following is a specification.

My invention relates to devices designed to be employed for compressing and slicing meat, and has for its objects to produce a comparatively simple inexpensive device of this character in which the meat under treatment may be pressed into compact form and cut into slices of uniform thickness, whereby the meat when displayed for sale will present a dainty attractive appearance.

To these ends the invention comprises the novel features of construction and combination of parts more fully hereinafter described.

In the accompanying drawings, Figure 1 is a perspective view of the meat receptacle or box, showing the same partly open. Fig. 2 is a vertical longitudinal section through the device, showing the presser member in position. Fig. 3 is an end elevation of the presser member.

Referring to the drawings, 1 designates as a whole the meat receptacle or box, comprising a base 2, side walls 3, and end walls 4, said walls being pivotally connected by hinges 5 or in other appropriate manner to the base, whereby they may be swung outward or collapsed, as illustrated in Fig. 1, for a purpose which will hereinafter appear, the walls being maintained in their normal non-collapsed position by means of hooks or other suitable retaining devices 6. The base 2 has formed integral therewith, or is otherwise provided with, a centrally-disposed bed or block 7, upon which the contents of the receptacle will rest, this block being of reduced area relative to the bed 2, whereby the walls of the receptacle will when in normal folded position bear at their inner faces against the marginal edges of the block, while the side walls 3 of the receptacle have formed therein series of vertical guide slots or ways 7, open at their upper ends and arranged in uniformly-spaced relation, the slots in one wall being oppositely disposed relative to those in the other.

For compressing the meat or other material within the receptacle I preferably employ a manually-operated pressure member or block 8, provided with a handle 9 and having a reduced portion 10 formed to fit snugly and work within the upper normally open end or mouth of the receptacle, the block being provided along its side walls with horizontally-overhanging flanges 11, designed to bear upon the upper marginal edges of the side walls 3 when the member reaches the limit of its downstroke.

In practice, supposing the receptacle to be in normal folded position, as illustrated in Fig. 2, an appropriate quantity of meat or other material to be compressed is placed therein and compressed into solid compact form by means of the member 8, which for the purpose is entered into the mouth of and forced downward in the receptacle upon the material, the slots 7 serving during this operation to permit the escape of air, which would otherwise offer resistance to the action of the presser-block. The material having been properly compressed is cut into slices by means of a knife or other suitable instrument, which during the slicing operation enters and is guided by the slots or ways 7, whereby slices of uniform thickness are produced. After slicing the material the sides of the receptacle may be released and unfolded or collapsed, as shown in Fig. 1, for displaying the meat for sale or permitting of its removal from the receptacle. If in unfolding the box the sides thereof adhere to the compressed meat, a thin-bladed knife may be passed between them for freeing the meat and preventing the latter being damaged in appearance.

From the foregoing it is apparent that I produce a simple inexpensive device admirably adapted for the attainment of the ends in view and one whereby the meat will after being prepared present a very attractive and tempting appearance. In attaining these ends it is to be understood that minor changes in the details of construction herein set forth may be resorted to without departing from the spirit of the invention.

Having thus described the invention, what is claimed is—

In a device of the class described, a receptacle comprising a base having a centrally-disposed block of reduced area relative to the base, and side walls pivoted at their lower edges to the base to swing in a vertical plane to collapsed or non-collapsed position, said walls being adapted when in non-collapsed position to bear at their inner faces against the marginal edges of the block and an opposite pair of the walls having guide-slots for the reception of a slicing implement, and a pressure-block adapted to enter the receptacle for compressing the material therein.

In testimony that I claim the foregoing as my own I have hereto affixed my signature in the presence of two witnesses.

VINE M. KENT.

Witnesses:
JOHN D. BOGARDUS,
W. W. MYERS.